(12) United States Patent
Sheen et al.

(10) Patent No.: US 6,383,535 B1
(45) Date of Patent: May 7, 2002

(54) EXTRUDED POTATO CASING AND METHOD OF MAKING

(75) Inventors: Shiowshuh Sheen, New Providence Boro; Marc Baggen, Franklin Township; Joseph Panarisi, Ocean Township; Alan J. Slesinski, South Bound Brook Boro, all of NJ (US)

(73) Assignee: Bestfoods, Englewood Cliffs, NJ (US)

( * ) Notice: Subject to any disclaimer, the term of this patent is extended or adjusted under 35 U.S.C. 154(b) by 0 days.

(21) Appl. No.: 09/526,347

(22) Filed: Mar. 16, 2000

(51) Int. Cl.[7] .................. A22C 13/00; A23G 1/216
(52) U.S. Cl. .................. 426/102; 426/105; 426/138; 426/284; 426/637
(58) Field of Search ................... 426/105, 138, 426/284, 637, 102

(56) References Cited

U.S. PATENT DOCUMENTS

| | | |
|---|---|---|
| 3,056,683 A | 10/1962 | Cyr |
| 3,399,062 A | 8/1968 | Willard, Jr. et al. |
| 3,468,673 A | 9/1969 | Keller |
| 3,687,688 A | 8/1972 | Stapley et al. |
| 3,761,282 A * | 9/1973 | Shatila .................. 426/102 X |
| 3,800,054 A * | 3/1974 | Giesfeldt ............... 426/138 X |
| 3,975,549 A | 8/1976 | Shatila et al. .............. 426/550 |
| 3,987,210 A | 10/1976 | Cremer ..................... 426/550 |
| 4,005,139 A | 1/1977 | Korschot et al. ........... 426/550 |
| 4,484,877 A | 11/1984 | Stucke et al. ............... 426/113 |
| 4,520,034 A * | 5/1985 | Ishii ....................... 426/102 X |
| 4,613,509 A * | 9/1986 | Ward et al. .............. 426/284 X |
| 4,663,180 A | 5/1987 | Padula ..................... 426/637 |
| 4,828,856 A | 5/1989 | Willard .................... 426/272 |
| 4,900,573 A | 2/1990 | Meyers et al. .............. 426/302 |
| 4,931,296 A | 6/1990 | Shanbhag et al. .......... 426/243 |
| 5,124,161 A * | 6/1992 | van Lengerich et al. .................. 426/138 X |
| 5,242,699 A | 9/1993 | Bednar et al. .............. 426/302 |
| 5,492,704 A | 2/1996 | Stubbs et al. ................ 426/96 |
| 5,601,861 A | 2/1997 | Gerrish et al. ............. 426/303 |
| 5,620,727 A | 4/1997 | Gerrish et al. ............. 426/302 |
| 5,622,741 A | 4/1997 | Stubbs et al. ............... 426/243 |
| 5,753,286 A | 5/1998 | Higgins ..................... 426/92 |
| 5,891,496 A | 4/1999 | Hannah et al. ............. 426/102 |

FOREIGN PATENT DOCUMENTS

CA 508065 * 12/1954 ............... 426/138

* cited by examiner

Primary Examiner—Arthur L. Corbin
(74) Attorney, Agent, or Firm—Ellen Plotkin

(57) ABSTRACT

A casing dough and food composition and hand held convenience food product comprising potato shreds, cellulose gum and starch, and methods for making same. The casing material may be hollow and filled with savory filling materials. The cellulose gum and starch form a film at the exposed surfaces of the casing materials and fill voids in exposed surfaces.

14 Claims, 2 Drawing Sheets

EXTRUDED POTATO CASING AND METHOD OF MAKING

BACKGROUND OF THE INVENTION

1. Field of the Invention

The invention concerns tubular hand held and convenience snack food products comprising potato shreds. In a preferred embodiment, the product comprises cylindrically shaped hollow casings comprising potato shreds and savory fillings, such as meats, cheeses or other processed dairy products, flavorings, spices, sauces and the like or combinations of savory fillings. The snack food is formed, cooked by frying, baking, par-frying, par-baking or combinations thereof, or otherwise, and then frozen. The product can be reconstituted by re-heating through conventional means, such as heating in an oven, toasting in a conventional residential toaster or toaster oven, or by microwave cooking. In a preferred embodiment, two or more ropes are connected through an axial indented ridge type connector to make a convenience snack food product with pull apart functionality.

The casing comprises potato shreds, starch, preferably modified starch, and cellulose gum. The potato shreds can be either fresh cut, dehydrated or combinations of fresh cut and dehydrated. The cellulose gum and starch independently interact with the potato shreds, and other ingredients of the casing, to support a potato shred matrix with a film on exposed surfaces and fill voids in the matrix at the exposed surfaces of the casing which allows the casing to be extruded and maintain its shape. This is particularly important when the casing is extruded in the form of hollow continuous ropes, to maintain the center core, axial cavity, during and after extrusion.

The gum, starch and potato shreds form a structural matrix, and the gum and starch form a film around the outer shell of the casing. The film serves a number of functions including providing a moisture barrier to regulate fat pick-up during frying of the product and to inhibit fat from leaching during reconstitution. The casing has the texture of processed hash brown potato patties that enhances product acceptability.

The invention also relates to methods for making the tube shaped snacks. The method comprises mixing potato shreds, either fresh cut, reconstituted dehydrated shreds or combinations thereof, with other ingredients, including starch and cellulose gum. The mixture is extruded through a nozzle or multiple nozzles, to form one or two or more continuous ropes on a conveyor system. The continuous ropes can be solid, or in the preferred embodiment, hollow (i.e. with an axial cavity, as in a tube). When filling is desired, the filling can be either extruded into the axial cavity defined by the inner walls of the hollow continuous rope, such as co-extrusion in the casing, or injected into the axial cavity. The continuous ropes can be physically moved together to form co-joined continuous ropes to obtain two or more ropes in an axial side-by-side arrangement which can be cut to a desired lengthwise size. After two or more ropes are arranged side-by-side, the product can be compressed. When two or more ropes are connected an axial indented ridge type connector is formed lengthwise along adjacent ropes. The axial indented ridge type connector provides the product with pull apart functionality. As such, when two or more continuous ropes are connected to form the product, the ropes can be broken apart at the axial indented ridge type connector without causing the casing around the filling to break or lose significant structure.

2. The Related Art

Hand held convenience snack foods having a filling surrounded by a casing typically have casings made from bakery formulas involving pastry dough. Bakery formulas generally involve grains and flours and the pastry dough tends to be homogenous which is both easy to form by extrusion or other means, or otherwise easy to fill. An example is cereal bar mixes made with pastry dough comprising multi-grains, and although these materials tend to have coarser grains compared to other pastry dough ingredients, the particles have substantial uniformity thus facilitating extrusion and filling.

Potato shreds are nonuniform and have bigger and longer particle size compared to grains and flours. As a result, dough comprising potato shreds lacks uniformity and is more difficult to handle and extrude. Dough comprising potato shreds will have the tendency to form open surfaces after extrusion or during the forming or filling process.

U.S. Pat. No. 4,828,856 describes hash brown type potato products made from de-hydrated formed or fabricated potato shreds which can be re-hydrated and formed into patties said to simulate fresh cut potato products. The re-hydrated mass has a moisture content of 40% to 55% so that the product can be sheeted with a 1 to 2 millimeter opening between sheeting rolls. The potato dough made from the shreds described in this patent cannot be extruded because of needed high extrusion pressures which are said to rupture a significant portion of the potato cells. Non-critical ingredients for these products are carboxymethylcellulose, which is said to be a processing aid for the sheeting operation, and certain food gums to reduce fat or oil pickup (uptake) during frying. U.S. Pat. No. 5,492,704 describes a process for making potato strands comprising shreds for use in hash brown potatoes, and re-hydration of the shreds in the form of sheets to make a hash brown potato product is exemplified in the patent.

U.S. Pat. No. 5,891,596 describes potato mixtures shaped by extrusion or otherwise that are processed as a reduced fat flash frozen potato product. The formed potato shapes are made from blended potato pieces, and the blended product contains small pieces and, thus, not potato shreds. U.S. Pat. No. 3,399,062 describes dehydrated granular products, such as crushed dehydrated potatoes, containing some aggregates of individual cells, re-hydrated at low temperature in the presence of cellulose ether thermal gelling agent and extruded to obtain a french fried potato product.

U.S. Pat. No. 3,975,549 describes agglomerated dehydrated potato products made from dehydrated potato particles that, after re-hydration with a binder, are extruded to form french fries. The binder may be either a gum, such as guar gum, or free starch from modifying the potato solids. U.S. Pat. No. 3,987,210 describes an extruded french fried potato product comprising dehydrated potatoes in the form of flakes, granules, flour, diced pieces or mixtures thereof with a binder comprising more than about 25% amylose starch. The starch is said to retrograde when heated with water to form a film around the product and provide an oil barrier.

U.S. Pat. No. 3,486,673 describes extruded french fried potato products comprising dehydrated mashed potatoes, methyl cellulose and polygalacomannan gum, which are said to be essential ingredients. The combination of ingredients reportedly provide the product with an irregular external crust which permits the product to pick up a modest amount oil during frying. U.S. Pat. No. 5,242,699 addresses an application of a hydrocolloid coating to potato strips to provide an exterior crust when the strips are blanched or par-fried which may also retard oil adsorption into the potato strip. U.S. Pat. No. 5,620,727 concerns use of low molecular weight ionic hydrocolloid compositions to make film to reduce oil uptake. U.S. Pat. No. 3,687,688 concerns immersion of potato into a batter comprising sodium alginate for moisture control, and U.S. Pat. No. 4,900,573 concerns batter comprising hydroxypropyl methylcellulose which is said to function as an oil barrier.

Fat absorption/uptake of fried foods is one of the major concerns of consumers, particularly with respect to dietary concerns as fat provides approximately 9 calories per gram to the food. Also, fat leaching from a prepared product during re-heating or reconstituting causes a greasy feel to food, and imparts undesirable organoleptic qualities to the food.

An object of the invention is to make a hand held convenience snack food product that comprises a casing with potato shreds that can be extruded and filled and then partially or fully fried or baked without significant excess oil absorption during cooking and without oil or fat leaching during reconstitution. An object of the invention is also an extrudable casing comprising potato shreds that has structural integrity which can withstand the extrusion and filling process, and other processing to axially join outer walls of two or more tubular casings in a snack food. These objectives are achieved by the unique potato shred matrix of the casing and the selection of cellulose gums which, with starch, forms a film on the exposed surfaces of the casing filling the voids in the potato shred matrix on exposed surfaces, which strengthens the matrix and inhibits oil/moisture transmission. These objectives are further achieved by the incorporation of an axial indented ridge type connector between adjacent attached casings.

The invention provides for an extruded baked or fried product comprising potato shreds wherein the integrity of the shreds is maintained despite the extrusion process. The cellulose gums and starch form a film around the exposed surfaces of the potato shred casing filling the voids at the exposed surfaces of the casing. As such, the casing maintains its shape during and after extrusion and the film helps control both oil pick-up during cooking and oil or fat leaching when the product is reconstituted. The moisture content is also important to processability as the moisture content of the casing, about 55% to about 75%, preferably about 60% to about 72%, facilitates extrusion and regulates oil uptake during cooking.

In the present Specification, all parts and percentages are by weight/weight unless otherwise specified.

SUMMARY OF THE INVENTION

The hand held and convenience tubular shaped snack products are formed from a single, or two or more, continuous ropes, that are either hollow or solid. In the preferred embodiment, the casing is hollow and cylindrical shaped having an inner wall, outer wall and an axial cavity defined by the inner wall, which can be filled with a variety of savory fillings, such as meats, cheeses, or other processed dairy products, flavorings, spices, sauces and the like, or combinations of these. The continuous ropes are formed by extrusion and two or more continuous ropes can be axially joined, and an axial indented ridge type connector lengthwise along adjacent ropes provides the product with pull apart functionality. In one aspect of the invention, a plurality of ropes are connected axially and radially cut to a lengthwise size to accommodate reconstitution, e.g., re-heating, in a conventional residential toaster or toaster oven. When the ropes are cut the casing is crimped to form ends of potato shred casing material which seals the filling within the axial cavity and the ends.

The continuous ropes (e.g. casings) comprise potato shreds and are formed by extrusion. The potato shreds can be fresh cut or dehydrated, or a combination of fresh cut and dehydrated. The casing further comprises cellulose gum and starch, preferably modified starch, which form a film and fill voids in the potato shred matrix at the exposed surfaces of the casing, and serves to facilitate a stable potato shred matrix and provides a fat/moisture barrier for the casing material. Cellulose gums useful for the casing are microcrystalline cellulose, methylcellulose, carboxymethylcellulose, hydroxyethylcellulose, hydroxypropylcellulose, hydroxypropylmethylcellulose or combinations thereof. The matrix is critical to the mechanical properties of the product and, together with the moisture content of the extruded casing, allows for extrusion of the casing with sufficient structural support, particularly when the casing is extruded in hollow form so that the casing material will not collapse into the axial cavity. The film regulates moisture loss during frying to control fat uptake, and also retards fat from leaching from the product during reconstitution. The snack product can be reconstituted by a number of means, including oven cooking, microwave cooking and heating in a conventional residential toaster or toaster oven. Leaching of fat during preparation would result in a greasy texture to the outer surface of the casing and poor organoleptic qualities. Thus, the matrix and film formed by the interaction of the gum and starch and potato shreds provide for an organoleptically acceptable product with a hash brown like texture and, particularly in the methods of toaster or toaster oven preparation, a product that will not undesirably leach oil or fat during re-heating or reconstitution.

The casing can comprise dehydrated potato shreds, fresh cut potato shreds or combinations thereof. When dehydrated potato shreds are used, the casing comprises about 20% to about 24% dehydrated potato shreds, about 3% to about 10% dried potato flakes, about 1% to about 4% starch, about 0.5% to about 2% flavorings, about 0.5% to about 2% sweetener, preferably dextrose, about 0.5% to about 2.5% cellulose gum and about 55% to about 75% water, preferably about 60% to about 72%. When fresh cut potato shreds are used, the casing comprises about 75% to about 95% fresh cut potato shreds, which may be moisture adjusted (e.g. dehydrated) to a moisture content of about 55% to about 75%, preferably about 60% to about 72%, about 3% to about 10% dried potato flakes, about 1% to about 4% starch, about 0.5% to about 2% flavorings, about 0.5% to about 2% sweetener, preferably dextrose, and about 0.5% to about 2.5% cellulose gum. Potato shreds as discussed herein are rectangular shaped potato pieces of random axial length, preferably up to about 76 millimeters, and a cross section of from about 6.4 millimeters to about 2.5 millimeters by about 3.2 millimeters to about 6.4 millimeters, preferably about 4.0 millimeters to about 2.5 millimeters by about 4.8 millimeters, and may be in dehydrated form.

The ingredients of the casing are mixed together and then the mixture is extruded through a nozzle or multiple nozzles to obtain one, or two or more cylindrically shaped ropes. In a preferred embodiment of the invention, the casing is extruded in hollow form, (i.e. tube like, having an axial cavity) and then filling is either co-extruded with the casing or injected into the axial cavity. Multiple nozzles can be used which. result in an array of two or more ropes extruded onto a moving conveyor. As the ropes move on the conveyor, the ropes physically move together, either through the movement of the conveyor or by physical means such as guides or wedges, and become connected at adjacent axial portions of outer walls of the casings to form a tube shaped snack food comprising two or more axially connected ropes. A rollover operation may be employed which involves moving the continuous ropes under one or more rollers that compress the ropes as desired. An axial indented ridge type connector having a radial width of about 2 to about 12 millimeters is formed along adjacent outer walls of the ropes thereby making co-joined ropes as a result of only a portion of outer walls of adjacent casings becoming attached. The axial indented ridge type connector provides the product with pull apart functionality, and adds rigidity to the casing of the overall product comprising two or more ropes. The ropes can then be cut radially to a desired length, to accommodate the method of preparation and size of equipment, (e.g. oven, microwave oven, toaster, etc.) for reconstitution, and the ropes are crimped at the time they are cut to form ends of potato shred casing material which seals the filling within the axial cavity and ends.

The cutting and crimping of the continuous ropes results in uncooked cut casings which are then cooked by frying or baking, including par-frying or par-baking and then frozen. The product can be reconstituted or reheated by means, such as a toaster, toaster oven or oven, or by microwave heating. The gum and starch provide a film around the casing which in part, inhibits the leaching of oil from the product during reconstitution thereby providing the product with acceptable organoleptic properties and texture, and reduced undesired greasy feel and, thus, the product has particular utility for hand held consumption. The gum and film also serves to enhance the structural support of the casing.

The process allows significant variation in product dimensions, particularly axial length, to accommodate differences in equipment sizes for re-heating and for future modifications by equipment manufacturers. The ability to vary the size of the product also allows for products to meet particular consumer choices. For example, the product can be cut to an axial length of about 8.5 centimeters to about 11 centimeters for current conventional toasters or toaster ovens, or could be cut longer for oven preparation or smaller to make a single serving pieces or hors d'oeuvres. The thickness is determined by the extrusion parameters and the roll over operation, the length is determined by cutting and the width is a function of the number of ropes axially attached together.

DETAILED DESCRIPTION OF THE INVENTION

Figure 1:
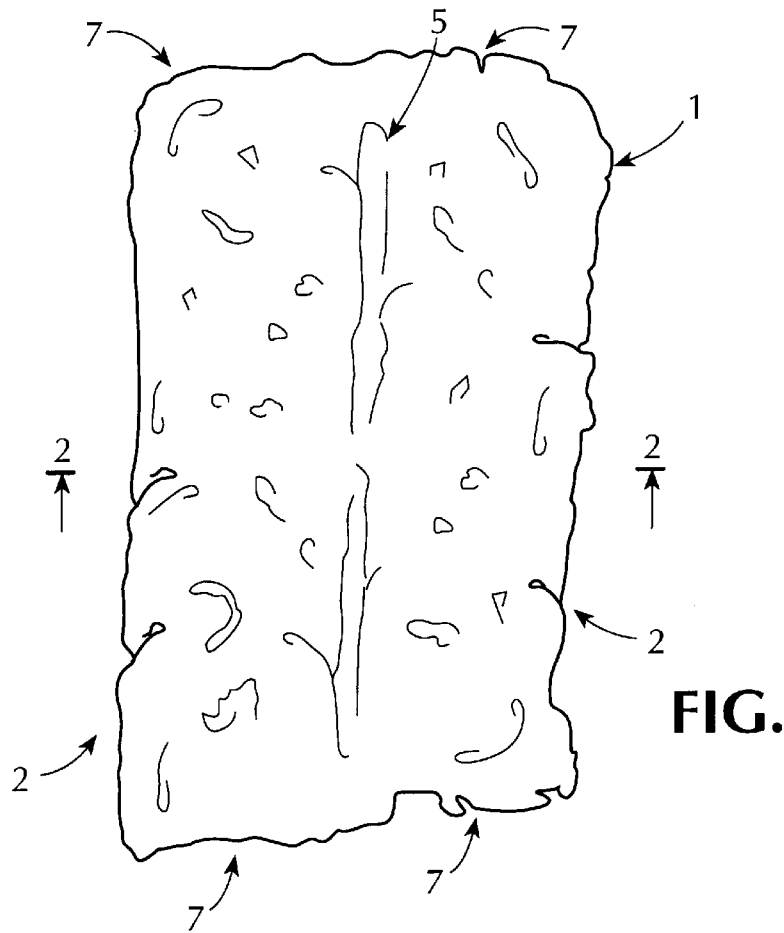
FIG. 1 is a top view elevation of the hand held snack food product in an embodiment where two continuous ropes are attached and cut and crimped for toaster or toaster oven preparation.
Figure 2:
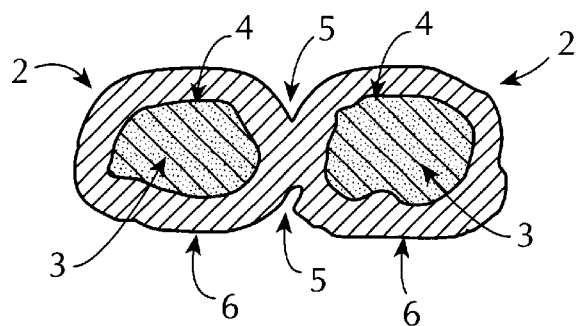
FIG. 2 is a cross sectioned view along line 2—2 of FIG. 1 of the hand held snack food product in an embodiment where two continuous ropes are attached and cut and crimped for toaster or toaster oven preparation.
Figure 3:
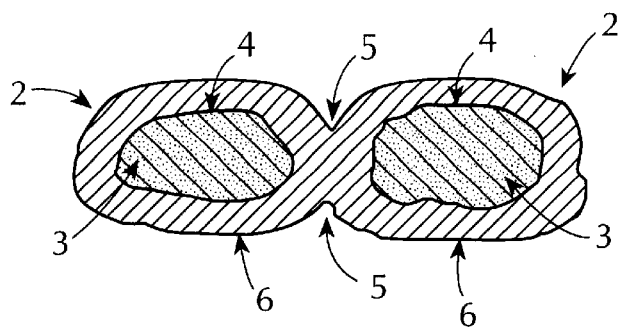
FIG. 3 is a cross sectioned view of two attached continuous ropes.
Figure 4:
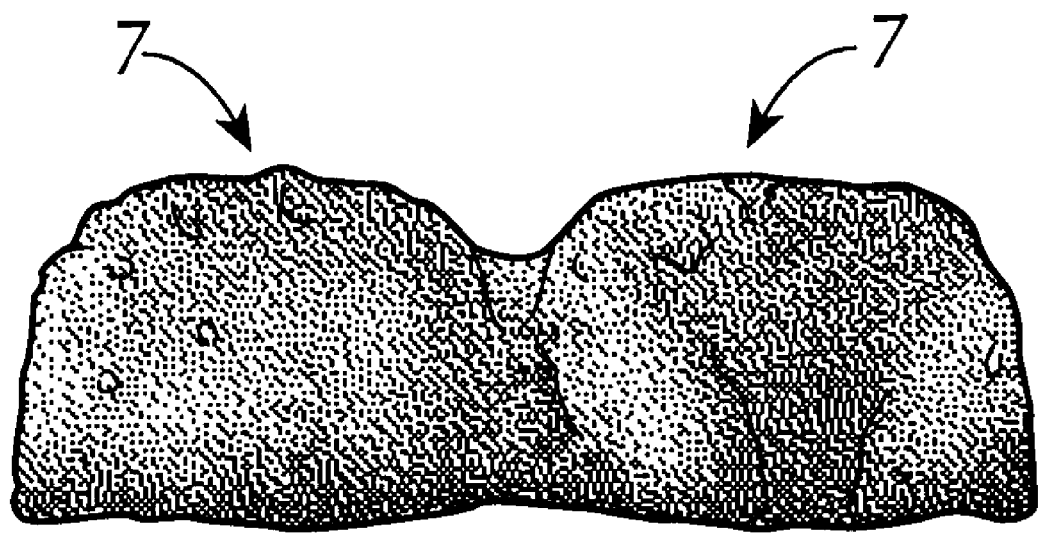
FIG. 4 is an end view elevation of the hand held snack food product in an embodiment where two continuous ropes are attached and cut and crimped for toaster or toaster oven preparation.

The hand held snack foods are a convenience food product designed to move from the package to serving with merely reconstitution, such as re-heating, by the consumer. Referring to FIGS. 1–4, the hand held snack food product 1 is generally depicted in FIG. 1. The product comprises a cylindrical shaped casing (ropes) 2 and filling 3 in the axial cavity defined by inner walls 4 of the casing 2 as shown in FIGS. 2 and 3 . When the product comprises two or more casings, an axial indented ridge type connector 5 is formed lengthwise along adjacent casings and is located at the point of attachment between the casings (ropes) 2 as shown in FIGS. 1–3 . It is to be understood that while FIGS. 1–3 show a product where two filled continuous rope casings are formed together with an axial indented ridge type connector 5, any number of casings, hollow and filled or solid, can be connected with axial indented ridge type connectors lengthwise between adjacent casings at each point of attachment. When the product is cut and crimped, the product comprises at least one; and preferably two, ends 7 as shown in FIGS. 1 and 4; of casing material which encloses the filling within the inner walls 4 of the casing and ends 7 forming uncooked cut casings wherein the filling is isolated within potato shred casing material.

The axial indented ridge type connector 5 as shown in FIGS. 1–3 results from the manner of the attachment. Preferably, the axial indented ridge type connector has a radial width of about 2 to about 12 millimeters. The axial indented ridge type connector allows the attached casings to be broken or split apart lengthwise without the aid of any utensils or tools. The product breaks at the axial indented ridge type connector without breaking the walls of the casing and exposing filling or impairing the basic structure of the cylindrical rope casings. Thus, the product can be broken down to serving sizes without the risk of filling escaping out from the casing during reconstitution and/or consumption. Accordingly, the product can be a hand held convenience food product.

The product comprises potato shreds and has a casing comprising potato shreds, cellulose gum, starch, and savory fillings which can be any variety of dairy or meat based substances, such as meat, cheeses or other processed dairy foods, flavorings, sauces, spices and the like, and combinations of these. The potato shreds have random length, preferably up to about 76 millimeters, and a cross section of from about 6.4 millimeters to about 2.5 millimeters by about 3.2 millimeters to about 6.4 millimeters, preferably about 4.0 millimeters to about 2.5 millimeters by about 4.8 millimeters.

The moisture content of the casing is important for extrusion of the potato shred and for the properties of the cooked product. A moisture content of between about 55% and about 75%, preferably about 60% to about 72%, provides sufficient moisture to form a flowable potato shred dough. Thus, the dough can be extruded without significant damage to the particulate structure of the potato and without impairment of the organoleptic characteristics of the potato shreds. If the moisture content is too low, the potato shred will tend to swell during extrusion creating difficulties with the extrusion, such as significant breakdown or destruction of the shred and individual potato particles so that the shreds lose their character, texture and organoleptic qualities. Low moisture content will also cause discontinuities in the outer surface of the casing and potato shred matrix and insufficient formation of the film or filling of the void spaces in the matrix on the exposed surfaces of the casing by the gum and starch which can result in undesired product properties, including appearance, taste, organoleptic characteristics and undesired oil uptake during cooking, and leaching during reconstitution. If the moisture content is too high uncooked casings, such as uncooked cut casings, will take up a greater amount of fat during frying or baking because repelled moisture during cooking is replaced with fat, thus resulting in poor organoleptic qualities and texture and undesired greasy feel and taste of the product after reconstitution. Accordingly, the moisture content regulates fat uptake.

The casing can be made with either fresh cut potato shreds or dehydrated potato shreds or combinations thereof. Fresh cut shreds are made from fresh potatoes which are comminuted by conventional means such as ricing, cutting, grinding or milling, and then the comminuted particles are sieved to obtain the desired size. Dehydrated potato shreds may be fresh cut dehydrated pieces. Fresh cut and dehydrated potato shreds are available from Nonpareil Co., Blackfoot, Id., U.S.A. The source or type of shred is not critical to the invention. The casing also comprises dried potato flakes which can be in the form of granulated, mashed or other processed potatoes and potato pieces.

When de-hydrated potato shreds are used, the casing comprises about 20% to about 24% dehydrated potato shreds, about 3% to about 10% dried potato flakes, about 1% to about 4% starch, preferably modified starch, about 0.5% to about 2% flavorings, about 0.5% to about 2% sweetener, preferably dextrose, about 0.5% to about 2.5% cellulose gum and about 55% to about 75% water, preferably about 60% to about 72% water. When fresh cut potato shreds are used, the casing comprises about 75% to about 95% fresh cut potato shreds, which may be adjusted (e.g. partially de-hydrated) to a moisture content of about 55% to about 75%, preferably about 60% to about 72%; about 3% to about 10% dried potato flakes, about 1% to about 4% starch, preferably modified starch, about 0.5% to about 2% flavorings, about 0.5% to about 2% sweetner, preferably dextrose and about 0.5% to about 2.5% cellulose gum.

The dehydrated potato shreds and added water, or freshly cut shreds, are combined with the other ingredients to form a mixture. The mixture is then extruded through a nozzle or multiple nozzles to form one, or two or more, continuous ropes of material. The continuous ropes may be in the form of a casing material in cylindrical form as shown in FIGS. 1–4, having an inner wall 4, outer wall 6 and an axial cavity defined by the inner wall 4, and the axial cavity may be filled with filling material 3. The multiple nozzle arrangement would form an array of two or more continuous ropes which can then be mechanically attached, as desired with a lengthwise axial indented ridge type connector 5 as shown in FIGS. 1–3. The ropes, which may be hollow and filled with savory filling are cut and crimped to form ends 7 of potato shred casing material as shown in FIGS. 1 and 4, which encloses the filling within the axial cavity and ends 7 forming uncooked cut casings. In a preferred embodiment, the ropes are cut into lengths to accommodate reconstitution by re-heating in current conventional residential toaster or toaster oven. The dimensions of the product can vary by processing conditions to accommodate different sizes of equipment for re-heating and future size changes, and to provide different sized products for consumer choice.

The first step in the process of making the snack food product concerns preparation of the potato shreds for extrusion. When fresh cut shreds, or a combination of fresh cut shreds and dehydrated shreds are used, re-hydration may not be necessary provided the moisture content is between about 55% and about 75%. When dehydrated potato shreds are used, the shreds must be re-hydrated to a moisture content of about 55% to about 75% prior to further processing. In either embodiment the preferred moisture content of the casing material prior to extrusion and cooking is between about 60% and about 72%. Dehydrated shreds are re-hydrated with water at a temperature of about 45° C. to about 95° C. for about 18 to about 60 minutes with interval mixing of about 1 to about 1.5 minutes about every 3 to 5 minutes during the time period. Mixing can be performed in any vessel capable of interval mixing, such as a standard paddle mixer available from Hobart Corporation, Troy, Ohio, U.S.A. or a ribbon type mixer. These mixers are understood in the art and require no further discussion.

The total mixing time and intervals for re-hydration of the dehydrated potato shreds is a function of the water temperature, and re-hydration of the shreds is possible at water temperatures less than about 45° C. or greater than about 95° C.. When temperatures lower than about 45° C. are used for re-hydration, an acceptable casing is feasible, however the mixing and standing intervals are too great for making a product on a commercial basis, as the re-hydration process can take overnight or more than 24 hours. Water temperatures above about 95° C. will have an adverse effect on the potato shred.

After the dehydrated shreds are re-hydrated; or if fresh cut potato shreds are used, after the moisture content is adjusted to the range of between about 55% and 75%, preferably about 60% to about 72%; other dry ingredients can then combined with the potato shreds, although the other dry ingredients can be added during the re-hydration. Preferably, however, all or some of these other dry ingredients, such as dried potato flakes, starch, flavorings, (e.g. onion flakes or powder), sweetener, preferably dextrose, and cellulose gum, are added after re-hydration of dehydrated potato shreds to avoid competition for water between the shreds and other ingredients during the re-hydration which could affect complete hydration of the dehydrated potato shreds. The cellulose gum and/or flavorings, for example, can be combined and mixed with or dispersed in the water used for re-hydrating the potato shreds either prior to or during the re-hydration step, or the cellulose gum can be added with the other ingredients after re-hydration is complete.

After the other dry ingredients are combined with the re-hydrated potato shreds, the ingredients and shreds are mixed continuously for about 3 to about 5 minutes in a mixing vessel, such as a continuous mixer equipped with a dough hook, available from Hobart Corporation. After mixing, the potato shreds and other dry ingredients are in the form of a dough which can then be processed by extrusion to obtain the casing material. Prior to extrusion, the dough can sit at ambient temperature for an indefinite amount of time, however a period of up to about 1 hour is preferred for making an acceptable potato shred casing.

The potato shred dough is then extruded in a single nozzle extruder, a series of single nozzle extruders or a multiple nozzle extruder, each of which may be a dual nozzle providing means for placing the filling within the axial cavity of the casing material to form one, or two or more continuous ropes. Preferred extruders are Model Nos. KN300, KN400, CN100 and 207 from Rheon USA, Huntersville, N.C., U.S.A. The filling is either injected into the casing or co-extruded in dual nozzle with the casing extruded in an outer nozzle and filling in an inner nozzle. The ratio of outer diameter/inner diameter of the preferred nozzles for extruding casings for products for toaster oven preparation in current equipment are 22/18 millimeters, 22/16 millimeters and 22/22 millimeters, available from Rheon USA. The thickness of the casing is dependent on the nozzle and the filling/casing ratio.

The casing, or casing/filling as the case may be, is extruded in continuous ropes onto a conveying system, such as a conveyor belt. In aspects of the invention where the snack food product comprises two or more ropes, two or more ropes are extruded and deposited on the conveying system such that two or more ropes become attached while on the conveying system. The ropes may be attached by orientation of the ropes on the conveyor and forward movement of the conveyor, and the ropes may be attached by physical means, such as the application of force by wedges and/or guides, while the ropes move on the conveyor. The two or more attached ropes comprise axial indented ridge type connectors having a radial width of about 2 to about 12 millimeters. For example, when three ropes are attached, a total of two axial indented ridge type connectors will be formed at the points of attachment between each outer rope and the middle rope.

While on the conveyor, the ropes or attached ropes move beneath one or two or more stationary rollers which can be adjusted to obtain a desired thickness and shape of the casings. As the casings move on the conveyor under the roller or rollers, the casings are compressed. This rollover operation is preferably performed after axial attachment of the continuous ropes when two or more ropes are attached together.

The ropes can be cut to desired size and crimped on each end to seal each end with casing material thereby enclosing the filling material within the axial cavity and the ends to obtain uncooked cut casings. The cutting and crimping operation generally occurs after the roll over operation. The cutting and crimping of the product can occur simultaneously by cutting with a blade while the continuous ropes are moving along the conveying system. The actual dimensions of uncooked cut casings can be varied to accommodate a variety of means for reconstituting and heating the product, such as a conventional residential toaster or toaster oven. After the continuous ropes are cut and crimped, the uncooked casings are then cooked by being fried, baked, par-fried or par-baked to prepare the cooked product for freezing. Freezing may be done in any commercial type freezer, preferably in a blaster type freezer, such as a Rinox Blast Chiller and Freezer available from Servolift Eastern Co., Boston, Mass., U.S.A.

During the cooking process, particularly when the uncooked casings are fried or par-fried, a certain amount of moisture from the casing material will be replaced with fat or oil, despite the gum/starch film that retards moisture loss. Generally, the casing material will experience a moisture loss, during cooking of about 8% to about 15%, and will experience about 6% to about 10% fat or oil uptake during cooking. The moisture content of the casing of the cooked product is about 45% to about 60%. Because moisture in the casing is replaced by oil, the moisture content of the casing regulates oil uptake as higher moisture content in the casing (e.g. more than about 75%) would result in greater amounts of moisture loss and oil uptake during cooking.

The axial indented ridge type connector between attached ropes serves to provide the product with break apart functionality. The axial indented ridge type connector also provides structural rigidity to the product.

The cellulose gum and starch, preferably modified starch, form a film around the casing and seals the potato shred matrix by filling the void spaces of the exposed surfaces of the casing which provides the casing with structural integrity. The gum also regulates fat uptake during frying, or cooking and inhibits fat from leaching during reconstitution. As set forth in Table I, inclusion of cellulose gum in amounts from 0.5% to 2.0% reduces fat uptake from between 16.5% and 27.0%, and the casing formula should include at least about 0.5% cellulose gum. The filling of the void spaces and film also retards oil from leaching from the product during reconstitution and provides for a crispier texture when the product is reconstituted, particularly by re-heating in a toaster or toaster oven. Preferred cellulose gums are microcrystalline cellulose, methylcellulose, carboxymethycellulose, hydroxyethycellulose, hydroxypropylcellulose, hydroxypropylmethylcellulose and combinations thereof. AVICEL® Type C-611F cellulose gel available from FMC Corporation, Philadelphia, Pa., USA can be used in the casing formula. The gum may be added in powder form with the other dry ingredients or dispersed in the water used to re-hydrate the dehydrated potato shreds. Physically or chemically modified starches are preferred because these types of starches impart better freeze thaw stability than native starches.

TABLE I

| Cellulose Gum (%, w/w in casing) | Fat uptake (%, casing) (fried at 375 F., 90 seconds) | % fat uptake reduction |
| --- | --- | --- |
| 0 | 11.5 | reference |
| 0.5 | 9.6 | 16.5 |
| 1.0 | 8.8 | 23.5 |
| 2.0 | 8.4 | 27.0 |

Note:
the fat content of casing before fry is 0.1 to 0.15%

The tube shaped snack food product has an exterior surface texture reminiscent of processed hash brown potato patties. The potato shred matrix creates an irregular surface with shreds slightly protruding from the surface and the cellulose gum and starch seal the surface. This surface texture results in a hand held convenience snack food type product with visual appeal and organoleptically enhanced properties because of the textured surface.

The potato shreds having irregular and random sizes results in a cross linked potato shred matrix throughout the casing material. This cross linking enhances the structural integrity of the casing. The gum and starch seal the exposed surfaces of the casing material and fills the void space in the matrix at the exposed surfaces of the casing thus fixing the cross-linked shreds in the form of a matrix providing further product stability and sets the textured surface of the product. The matrix also provides a casing material with greater homogeneity such that extrusion is facilitated and the casing material is devoid of undesirable gaps which affect product appearance and the potential for filling material to escape from the casing during extrusion and processing or when the finished product is reconstituted.

EXAMPLES

Example 1

Dehydrated potato shreds having an average cross section of about 2.5 millimeters by about 4.8 millimeters, with random length, were re-hydrated with water at 75° C. in a Hobart 80 quart mixer for a total time of 35 minutes with interval mixing of 1.5 minutes at speed 1 every 5 minutes. After re-hydration the other dry ingredients were combined with the potato shreds in the Hobart mixer and then mixed on a continuous basis at speed 2 for 5 minutes to form the casing material. The composition of the casing material and ingredients is set forth in Table II. The casing material comprised AVICEL Type CL-611F cellulose gel available from FMC Corporation and Crisp Film Starch available from National Starch, Bridgewater, N.J., USA.

TABLE II

| Dehydrated Potato Shreds | 22.5% |
|---|---|
| Dried Potato Flake | 5.0% |
| Starch (Modified) | 2.0% |
| Sugar | 0.5% |
| Salt | 1.0% |
| Water | 67.0% |
| Flavorings | 1.0% |
| Cellulose Gum | 1.0% |

Two casings were extruded using two Rheon 207 extruders, with dual nozzles having a ratio of 22/18 millimeters (outer diameter/inner diameter) with a casing setting at 3 and filling setting at low. The potato shred casing was filled with restricted melt cheese sauce available from Kraft Foods Ingredients, Memphis, Tenn., U.S.A. The extruded multiple rope casings were conveyed on a conveyor and the 2 ropes were physically attached and then compressed. The attached ropes were cut by hand to length of approximately 85 to 110 millimeters to obtain uncooked cut casings. The uncooked cut casings were then cooked by immersion in partially hydrogenated oil at a temperature of 375° F. for a period of 90 seconds using a Pitco Frialator Model E14 electric fryer available from Pitco Frialator, Concord, N.H., USA. The cooked product was then cooled, frozen in a Rinox Blast Chiller and Freezer available from Servolift Eastern Company and reconstituted by par-baking using a baking oven, Model UB-3T from NU-VU, Menominee, Mich., USA. The snack food performed adequately during extrusion, frying and par-baking.

Frozen product of Example 1 was subjected to scanning electron microscopy (SEM) to observe the outer surface of the product. The textured surface of the casing and a continuous potato shred matrix were observed. The casing had little, if any, discontinuities and cellulose gum was observed to be filling void spaces in the potato shred matrix on the outer surface of the casing.

Example II

Casing formulas were prepared to evaluate the replacement of potato shreds with dried potato flakes in the formula. The test casing formula, comprising a higher amount of dried potato flakes, is set forth in Table III and a control formula is set forth in Table IV. Twenty five percent of the dehydrated potato shreds in the control formula (Table IV) are replaced with dried potato flakes in the test formula (Table III).

TABLE III (TEST)

| Dehydrated Potato Shreds | 16.99% |
|---|---|
| Dried Potato Flake | 9.66% |
| Water | 68.0% |
| Flavorings (Onion Powder) | 1.0% |
| Dry Mix | 4.35% |

TABLE IV (CONTROL)

| Dehydrated Potato Shreds | 22.65% |
|---|---|
| Dried Potato Flake | 4.00% |
| Water | 68.0% |

TABLE IV-continued (CONTROL)

| Flavorings (Onion Powder) | 1.0% |
|---|---|
| Dry Mix | 4.35% |

The dry mix comprises modified starch, sugar, salt and AVICEL Type CL-611F cellulose gum from FMC Corporation. The casing was formulated and extruded in accordance with the process and extrusion methods, and equipment described in Example 1. Restricted melt cheese sauce from Kraft Foods was used for the filling material. The filled product had a ratio of 75 parts casing to 25 parts filling.

The casings were hand cut into pieces and fried in a Model E14 electric fryer from Pitco Frialator in partially hydrogenated frying oil at a temperature of 375° F. Samples of the control and test runs were fried for periods of 90, 120 and 150 seconds.

The test samples comprising a greater amount of dried potato flake performed adequately. The dried potato flake has significantly less cost than potato shreds, and potato shred processing time, e.g. re-hydration, can be decreased with use of more dried potato flakes. Thus, the ability to use larger quantities of dried potato flakes in lieu of potato shreds in the casing represents a substantial cost savings.

What is claimed is:

1. A food product having an extruded casing with exposed surfaces comprising potato shreds, dried potato flakes, starch, flavorings, sweetener and cellulose gum wherein the potato shreds are in the form of a matrix having void spaces and the cellulose gum and starch seal the matrix by filling the void spaces at the exposed surfaces.

2. The food product of claim 1 having from about 3% to about 10% of said dried potato flakes, about 1% to about 4% of said starch, about 0.5% to about 2% of said flavorings, about 0.5% to about 2% of said sweetener and about 0.5% to about 2.5% of said cellulose gum.

3. The food product of claim 1 further comprising filling material.

4. The food product of claim 1 wherein said cellulose gum is selected from the group consisting of microcrystalline cellulose, methylcellulose, carboxymethylcellulose, hydroxymethylcellulose, hydroxypropylcellulose, hydroxypropylmethylcellulose and combinations thereof.

5. The food product of claim 1 wherein said starch is a modified starch.

6. The food product of claim 1 wherein said potato shreds are dehydrated.

7. A hand held convenience snack food product comprising at least one extruded casing having an inner wall, an outer wall, at least one end and an axial cavity defined by said inner wall and having exposed surfaces, said casing material comprising potato shreds, dried potato flakes, starch, flavorings, sweetener and cellulose gum wherein the potato shreds are in the form of a matrix having void spaces and the cellulose gum and starch seal the matrix by filling the void spaces at the exposed surfaces.

8. The food product of claim 7 having about 3% to about 10% of said dried potato flakes, about 1% to about 4% of said starch, about 0.5% to about 2% of said flavorings, about 0.5% to about 2% of said sweetener and about 0.5% to about 2.5% of said cellulose gum.

9. The handheld convenience snack food product of claim 7 further comprising filling material in said axial cavity.

10. The hand held convenience snack food product of claim 9 wherein said filling material is selected from the group consisting of meat, cheese, processed diary products, flavorings, sauces, spices and combinations thereof.

11. The hand held convenience snack food product of claim 7 comprising two or more of said extruded casings wherein the extruded casings are attached in an axial orientation and have an axial indented ridge type connector at the point of attachment between adjacent casings.

12. The hand held convenience snack food product of claim 11 wherein said axial indented ridge type connector has a radial width of about 2 to about 12 millimeters.

13. The hand held convenience snack food product of claim 7 wherein said cellulose gum is selected from the group consisting of microcrystalline cellulose, methylcellulose, carboxymethylcellulose, hydroxyethylcellulose, hydroxypropylcellulose, hydroxypropylmethylcellulose and combinations thereof.

14. The hand held convenience snack food product of claim 7 wherein said starch is modified starch.

* * * * *